UNITED STATES PATENT OFFICE.

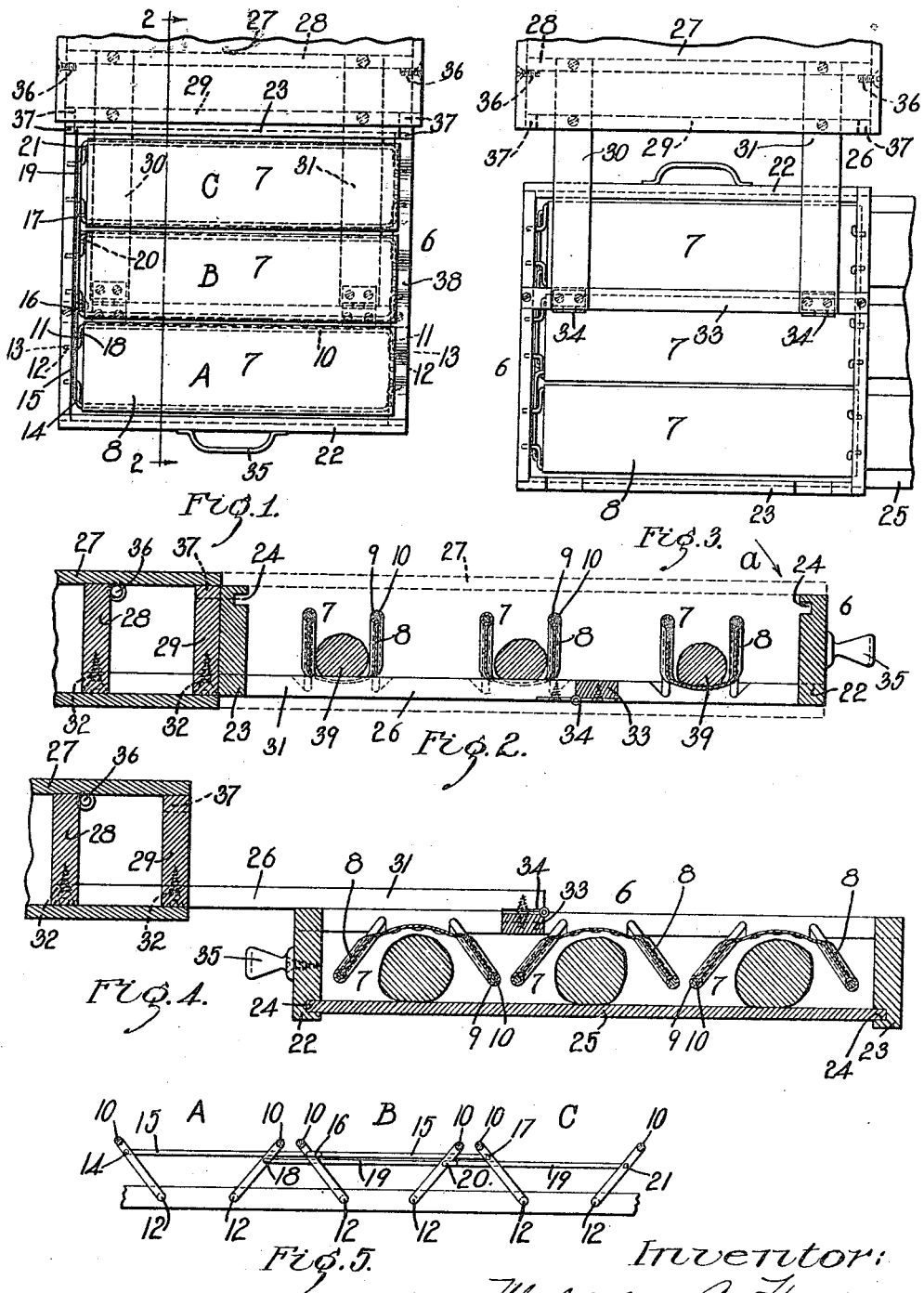

MALCOLM A. HAMILTON, OF WALTHAM, MASSACHUSETTS.

DEVICE FOR PROOFING DOUGH.

1,214,302.  Specification of Letters Patent.  Patented Jan. 30, 1917.

Application filed February 23, 1916. Serial No. 79,909.

*To all whom it may concern:*

Be it known that I, MALCOLM A. HAMILTON, a citizen of the United States, residing at Waltham, in the county of Middlesex and State of Massachusetts, have invented new and useful Improvements in Devices for Proofing Dough, of which the following is a specification.

This invention relates to devices for proofing dough. The present method of accomplishing this result is to place the dough after the kneading thereof has been completed in a cloth, and after wrapping said cloth about said dough, it is permitted to stand for a certain period, preferably about three quarters of an hour until it has risen or what is termed proofed. The cloth is then unfolded from the dough and the pieces thereof taken by hand and placed in a pan or upon what is known as a peel, which is placed in the oven and the dough thereon baked. Considerable time is wasted with this method in wrapping the cloth about the dough and also in removing the dough from the cloth and placing it upon the peel, it being necessary for the baker to handle the pieces of dough separately, this feature in itself being extremely undesirable and to say the least unsanitary.

The object of the present invention is to do away with the slow, tedious and unsanitary method hereinbefore described by providing a device capable of holding a large number of strips of dough in the desired shape for proofing, all of which may be simultaneously wrapped without necessitating the handling, thereof and inclosed in a suitable casing, whereby the proofing may be completed. The device is then capable of being operated to simultaneously place all of the dough contained therein upon a peel or within a suitable pan without necessitating the handling or touching of said dough, said peel being then placed within the oven in the usual well known manner.

The invention consists in the combination and arrangement of parts set forth in the following specification and particularly pointed out in the claims.

Referring to the drawings: Figure 1 is a plan view of a device embodying my invention, portions of the casing thereof being broken away to save space in the drawings. Fig. 2 is a section taken on the line 2—2 of Fig. 1, illustrating the dough receptacles filled with dough and in their closed positions. Fig. 3 is a plan view similar to Fig. 1, illustrating the frame inverted and the peel partially withdrawn. Fig. 4 is a section similar to Fig. 2 illustrating the frame inverted and the dough resting upon the peel in readiness to be withdrawn from the frame and placed in the oven to bake. Fig. 5 is a detail view of the means which connect like edges of the several U-shaped receptacles together to effect the simultaneous movement of like portions of said several U-shaped receptacles.

Like numerals refer to like parts throughout the several views of the drawings.

In the drawings, 6 is a frame, preferably rectangular in shape, and open at the top and bottom thereof. One or more U-shaped receptacles 7 being constructed and arranged to contain dough, three being shown, are arranged in said frame and constitute dough holders. The receptacles 7 are constructed of sheet material, preferably cloth 8. The sheet material 8 for each of said receptacles is preferably looped at 9, along opposite edges thereof and through said loops are passed rods 10 which extend from one end of said frame 6 to the other.

Each of the rods 10 is offset at 11, 11 adjacent the opposite extremities thereof. The extremities 12, 12 of said rods are preferably directed outwardly and extend into recesses 13 formed in opposite ends of said frame. The rod for each of said sheets of material are parallelly disposed and the cloth which is suspended therefrom forms the U-shaped receptacle. When more than one receptacle is employed like rods of all the said receptacles are connected together so as to insure a simultaneous pivotal movement of said rods to open or close said receptacles. The manner in which this result is accomplished will be more readily understood by referring to Figs. 1 and 5. The three receptacles will, for the sake of clearness, be designated as A, B and C. The left hand rod 10 of the receptacle A is pivotally connected at 14 by a rod 15 with the left hand rod of the receptacle B at 16. From the point 16 said rod 15 continues to the left hand rod 10 of the receptacle C and is pivotally connected thereto at 17, thus equally spacing said rods and causing them to move simultaneously about their extremities or pivots 12.

The right hand rod of the receptacle A is pivotally connected at 18 with a rod 19 which extends to the right hand rod 10 of the receptacle B and is pivotally connected with said rod at 20 and then said rod 19 extends to the right hand rod of the receptacle C to which it is pivotally attached at 21, thus insuring a simultaneous movement of the three similar rods for the several receptacles A, B and C.

The sides 22 and 23 of the frame 6 which are disposed parallel with the rods 10, are provided with grooves 24 adjacent to their upper edges adapted to receive the opposite edges of a slide 25 preferably constituting a peel, an instrument well known to those skilled in the art, and utilized for placing articles in an oven to be baked or to withdraw said articles from said oven, or, said slide may be in the form of a pan if desired. When a peel is used, as illustrated in the drawings, the same is inserted in said grooves so as to extend substantially across the frame from one end of the receptacle 7 to the other and directly above the rods 10.

The frame 6 is invertibly mounted upon a slide 26 constructed and arranged to slide for a limited distance within a casing 27; the slide 26 preferably embodies in its construction a pair of upright partitions 28 and 29 arranged substantially parallel with each other transversely of the casing 27 and arranged to substantially fit said casing. The partitions 28 and 29 are separated from each other by a substantial space, said space being maintained by two supporting members 30 and 31, each of said supporting members being secured adjacent to the opposite ends of said upright partitions 28 and 29 preferably by screws 32.

The members 30 and 31 constitute the base of the slide 26 and extend for a substantial distance beyond the partition 29 beneath the frame 6, a distance preferably more than half of the width of said frame. The frame 6 is provided with a cross-bar 33 arranged in close proximity to the extremity of the supporting members 30 and 31, said cross-bar 33 being pivotally attached to each of said supporting members by hinges 34. The bulk of the weight of said frame 6 will be upon the side of said frame immediately above the supports of the slide 26 and thereby maintain said frame in an upright position, but permitting said frame, when sufficient pressure is applied to the side 22 thereof, to move downwardly as indicated by the arrow $a$, Fig. 2, to be inverted.

The sides 22 and 23 of said frame 6 are substantially coextensive with the partitions 28 and 29 thereby permitting the frame together with the slide 26 to be pushed back in the casing 27 so as to entirely close the receptacles 7 and protect the same while proofing, the position of the casing at such a time being indicated in dotted lines, Fig. 2.

A handle 35 is attached to the side 22 of said casing to facilitate the movements of the frame and slide relatively to said casing. Stops 36, 36 in the form of screws protrude into the casing 27 and engage the inner partition 28 when the outermost partition 29 reaches a position at the mouth of said casing as illustrated in Figs. 1 to 4 inclusive and prevents the complete withdrawal of the partitions from said casing and thereby provide ample support for the slide 26 during the inverting of the frame 6, also during the filling of the several receptacles 7. The outer partition is cut away at 37 so as not to interfere with the stops 36 during the sliding movement of the frame into the casing.

One of the ends of the frame 6, preferably the end 38, is cut away so as to provide an opening equal in size to the ends of the three receptacles 7.

The operation of the device hereinbefore described is as follows: The dough, after being properly kneaded is placed in the several receptacles 7, either in one long piece or in a number of pieces, and may be either loaves of bread or rolls; the form of the dough at this stage is indicated at 39, Fig. 2. After all of said receptacles have been filled the rods 10 on opposite sides of each of said receptacles are moved toward each other to close the receptacle about the dough contained therein in order to assist in maintaining the same in the proper form, see also Fig. 2. The frame is then pushed into the casing 27 so as to be entirely inclosed thereby and the dough permitted to stand for a desired length of time to permit the final raising or proofing thereof. After this has been completed, the frame is again withdrawn to the position illustrated in full lines in Fig. 2 and the peel, slide, pan or whatever the device may be, is attached to the frame, preferably as shown in said figure. The rods 10 of the several receptacles are separated to separate the sides of the U-shaped receptacle as far as possible. The frame 6 is then inverted by being rocked about the axis of the hinges 34 from the position shown in Fig. 2, to that illustrated in Figs. 3 and 4, whereupon the dough contained in the several dough receptacles will be dumped from said receptacles upon the peel or slide 25, permitting said slide to be withdrawn from the grooves 24 through the openings 38 in the end of the frame 6, and withdrawing with it all the dough which has been dumped from the several receptacles. The slide 25 is then ready to be placed within the oven and the dough thereon baked. From the time the dough is placed within the several receptacles there is no necessity for the baker to touch with his hands any portion thereof. Furthermore all of the pieces of dough contained within the frame which may vary according to the size thereof would be taken care of, simultaneously, resulting in a great saving of time as compared with the present methods of handling dough in the proofing thereof.

The casing 27 is constructed so as to permit a number of casings of the same kind to be placed one above the other and thus occupy very little additional space.

Having thus described my invention what I claim and desire by Letters Patent to secure is:

1. A device of the class described having, in combination, a casing, an invertible frame slidably arranged in said casing, a U-shaped receptacle arranged in said frame, said receptacle being constructed of cloth adapted to hold dough, and a peel detachably secured to said frame above said U-shaped receptacle adapted to catch the dough as it drops from said U-shaped receptacle when said frame is inverted.

2. A device of the class described having, in combination, a frame, a plurality of U-shaped receptacles constructed of sheet material each adapted to hold dough, said receptacles being disposed in substantially parallel relation in said frame, the upper edges of said U-shaped receptacles being movable toward each other to wrap said sheet material about the dough contained therein, and means adapted to connect like edges of said U-shaped receptacles together, whereby a simultaneous movement thereof will result.

3. A device of the class described having, in combination, an invertible frame, a pair of parallel members mounted in said frame and movable toward and away from each other, a piece of sheet material suspended at opposite edges thereof from said members respectively and constituting a dough receptacle, and means constructed and arranged to catch said dough when said frame is inverted.

4. A device of the class described having, in combination, a frame, a plurality of pairs of parallel members mounted upon said frame, the members constituting each pair being movable toward and away from each other, a piece of sheet material suspended at opposite edges from the parallel members of each pair and constituting a dough receptacle, and means for simultaneously moving the parallel members of each pair toward each other to wrap said material about the dough contained therein.

5. In a device of the class described a frame, a pair of parallel rods each having offset ends pivotally mounted in said frame, and a piece of cloth attached along opposite edges thereof to said rods respectively, said cloth constituting a dough receptacle, said rods being movable toward each other to wrap said cloth about the dough contained therein.

6. A device of the class described having, in combination, an invertible frame, a U-shaped receptacle mounted upon said frame, and adapted to hold dough, said frame having an opening in one end thereof adjacent to the end of said U-shaped receptacle and alining therewith, guides on said frame disposed parallel with said receptacle, and a peel adapted to be inserted in said guides above said receptacle to catch the dough carried by said receptacle when the same is inverted and to withdraw said dough through the opening in said frame when said peel is removed from said frame.

In testimony whereof I have hereunto set my hand in presence of two subscribing witnesses.

MALCOLM A. HAMILTON.

Witnesses:
CHARLES S. GOODING,
SYDNEY E. TAFT.

Copies of this patent may be obtained for five cents each, by addressing the "Commissioner of Patents, Washington, D. C."